US006495063B1

(12) United States Patent
Smith et al.

(10) Patent No.: US 6,495,063 B1
(45) Date of Patent: Dec. 17, 2002

(54) TREATING COAL AND OTHER PILED MATERIALS TO INHIBIT FREEZE BINDING

(75) Inventors: Kevin W. Smith, McMurray, PA (US); Mark E. Stanley, Wexford, PA (US)

(73) Assignee: Clearwater, Inc., Pittsburgh, PA (US)

( * ) Notice: Subject to any disclaimer, the term of this patent is extended or adjusted under 35 U.S.C. 154(b) by 0 days.

(21) Appl. No.: 09/943,998

(22) Filed: Aug. 31, 2001

(51) Int. Cl.[7] .................................................. C09K 3/18
(52) U.S. Cl. .......................................... 252/70; 106/13
(58) Field of Search ............................... 252/70; 106/13

(56) References Cited

U.S. PATENT DOCUMENTS

| | | | |
|---|---|---|---|
| 2,233,185 A | 2/1941 | Smith | |
| 4,117,214 A | 9/1978 | Parks et al. | |
| 4,287,236 A | 9/1981 | Kestner et al. | |
| 4,746,449 A | 5/1988 | Peel | |
| 5,064,551 A | 11/1991 | Smith | |
| 5,079,036 A | * | 1/1992 | Roe et al. ...................... 106/13 |
| 5,104,562 A | 4/1992 | Kardos et al. | |
| 5,132,035 A | 7/1992 | Hoenke et al. | |
| 5,730,895 A | 3/1998 | Moore | |
| 5,843,330 A | 12/1998 | Barbour et al. | |
| 5,846,450 A | 12/1998 | Atkinson | |
| 5,922,241 A | 7/1999 | Becker et al. | |
| 5,993,875 A | 11/1999 | Hjornevik | |
| 6,059,989 A | 5/2000 | Stankowiak et al. | |
| 6,059,996 A | 5/2000 | Minks et al. | |
| 6,129,857 A | 10/2000 | Sapienza | |
| 6,156,226 A | * | 12/2000 | Klyosov et al. ............... 106/13 |
| 6,287,480 B1 | * | 9/2001 | Berglund et al. ............. 106/13 |

FOREIGN PATENT DOCUMENTS

| | | |
|---|---|---|
| EP | 0 306 972 B1 | 3/1989 |
| WO | 97-01612 * | 1/1997 |

* cited by examiner

*Primary Examiner*—Anthony J. Green
(74) *Attorney, Agent, or Firm*—William L. Krayer

(57) ABSTRACT

Coal and other piles of particulates exposed to the weather are inhibited from freezing by treating them with potassium formate.

16 Claims, No Drawings

TREATING COAL AND OTHER PILED MATERIALS TO INHIBIT FREEZE BINDING

TECHNICAL FIELD

This invention relates to inhibiting the freezing of water on coal and other particulate products, to maintain a substantially free-flowing state under otherwise subfreezing conditions. Under the influence of the invention, ice crystals which may be formed are weaker than would otherwise would be the case, also tending to maintain a substantially free-flowing state in coal piles and in other accumulations of particulate materials to be moved.

BACKGROUND OF THE INVENTION

Coal is stored, shipped and transferred in many locations having cold climates and in areas likely to experience temperatures below the freeze point of water. Most material handling equipment is designed to handle free-flowing materials, not materials which are frozen together in large chunks. Entire piles of coal have been known to accumulate significant amounts of water which may continue to accumulate over a period of days and become almost monolithic, frustrating efforts to break them apart and ship or transfer without extraordinary efforts.

The problem is stated succinctly by Parks et al in U.S. Pat. No. 4,117,214, column 1, lines 22–36: "For example, coal with as little as 4% moisture will, when frozen, cohere so strongly as to require special handling to break up the frozen mass. It thus becomes difficult to unload or dump railway cars, trucks and other conveyances used to transport coal, mineral ores and other finely divided solids. It also makes difficult the movement of coal out of outdoor coal storage piles in a condition for fuel or other use. Unloading frozen coal from railroad cars is time consuming, can result in blocked dump chutes and can often leave as much as 30 to 60 tons of coal in the car. Various techniques such as vibration, steam lances, fires under the cars, infrared heating in warming sheds and even dynamiting have been tried to unload frozen cars." Parks et al go on to suggest applying to the coal a solution of a non-volatile organic compound and a water-soluble polyhydroxy compound or monoalkylether thereof, in order to weaken the ice that is nevertheless formed.

SUMMARY OF THE INVENTION

I have found that spraying a solution of potassium formate on a pile or other mass of coal, minerals or other solid particulate material will inhibit the formation of coherent ice in the interstices of the particulate material. The effects of a solution of potassium formate are three: the freeze point of water is reduced, thus inhibiting the formation of ice; where ice is nevertheless formed in the presence of potassium formate, it is weaker than ice formed in the absence of potassium formate, and, if ice has already been formed prior to the application of potassium formate, the application of potassium formate will melt the ice.

Preferably the spray of potassium formate solution is applied prior to the onset of snow or freezing rain. The spray may be conducted so that the coal or other particulates are wet with the solution at the time the snow or freezing rain arrives, or so that the water from the solution has evaporated by the time the precipitation arrives, leaving a residue of potassium formate on the particulates. In the former case, (prior to the arrival of precipitation), the still liquid solution of potassium formate on the surface of the particulates may be diluted with moisture from the snow in immediate contact with it before the pile is covered with snow, but the effect is that if ice forms, an underlayer of potassium formate solution is actually in contact with the coal or other particulate surface, and the freeze point of the solution is thereby reduced. Even when or if there are cycles of thawing and freezing, the concentration of potassium formate remains highest at the surface of the coal, mineral or other particulates, greatly decreasing the tendency of the weakened ice which does form to coalesce a large portion of the pile or other mass.

In the second case, where the potassium formate solution is sprayed on the previously formed ice or frozen mass of ice and snow, the solution will tend to dissolve the frozen mass, because of its lower freezing point.

In a third variation of the invention, finely divided solid potassium formate is sprinkled on the pile or mass of particulates prior to precipitation likely to form a frozen mass in the interstices of the particulates.

The term "particulates" is used herein to refer to both small and large substantially water-insoluble particles, ranging from finely ground material to large lumps such as large lumps of coal, and includes materials and ores having a wide range of hardness and moisture contents.

DETAILED DESCRIPTION OF THE INVENTION

Table 1 shows the freeze points of increasing concentrations of potassium formate in water.

TABLE 1

| Potassium Formate Solution Freeze Points | |
|---|---|
| Percent by Weight KCOOH | Freeze Point, ° F. |
| 4 | 28 |
| 8 | 23 |
| 12 | 18 |
| 16 | 11 |
| 20 | 4 |
| 24 | −5 |
| 28 | −13 |
| 32 | −25 |
| 36 | −37 |
| 40 | −49 |
| 44 | −61 |
| 48 | −75 |

When applying the potassium formate solution by spraying ahead of precipitation likely to freeze, I may use concentrations of 1% to 76% by weight, preferably 15% to 60%, and more preferably 30% to 55%. When applying the potassium formate solution to an already frozen mass of material, a concentration of 60% to 76% is preferred; most preferably it is applied in the form of a high pressure spray. By a high pressure spray, I mean one having a pressure higher than normally obtained from a municipal water pressures; it may be in the form of a solid stream or as one or more jets. The solution may be heated.

Experiments were performed to determine the effectiveness of the invention on the cohesive strength of wet coal below 0° C. Comparisons were made of 50% ethylene glycol in water (Control) to potassium formate at 38 and 50 weight percent in water. Minus 6 mesh coal was first thoroughly mixed and divided into three samples which were adjusted to 5%, 10%, and 15% moisture content. Each sample was then divided into five portions and placed in separate plastic bags. Using a syringe, the three solutions were added to each bag at a rate equivalent to two pints per ton, and thoroughly mixed to wet the surfaces of the particulates. For each of the three solutions to be tested, five substantially similar 1 kg wet samples were poured onto pans previously lubricated with mold release agent. The 1 kg samples of coal were consolidated by dropping them a distance of 1 inch to a laboratory bench, and then frozen on the pans at −10° C. (14° F.) for 24 hours.

The pans were then inverted and the frozen samples dropped onto a steel grate having 1.25 inch square openings. The procedure for each drop was to drop from the prescribed height, remove and weigh the coal which passed through the grate, retrieve the remaining coal from the top of the grate, and drop it from the next incremental height. The coal passed was weighed, the remaining coal retrieved and dropped from the next incremental height. The procedure was iterated until all the coal passed or until the drop height limit of 8 feet was reached. At certain heights, as many as 5 drops were used and the results averaged; at other heights, fewer drops were needed, as it was clear, for example, that virtually all the coal would pass. Following, in Table 2, is a summary of the results.

TABLE 2

| | Weight Percent Coal Passing Grate | | | | | | | | |
|---|---|---|---|---|---|---|---|---|---|
| | 5% Moisture | | | 10% Moisture | | | 15% Moisture | | |
| Drop Ht, ft | 50/50 EG | 38% KF | 50% KF | 50/50 EG | 38% KF | 50% KF | 50/50 EG | 38% KF | 50% KF |
| 2 | 100 | 100 | 100 | 43 | 42 | 37 | 4 | 5 | 5 |
| 3 | 100 | 100 | 100 | 83 | 78 | 79 | 13 | 11 | 10 |
| 4 | 100 | 100 | 100 | 99 | 99 | 98 | 22 | 21 | 19 |
| 5 | 100 | 100 | 100 | 100 | 100 | 100 | 33 | 31 | 32 |
| 6 | 100 | 100 | 100 | 100 | 100 | 100 | 48 | 44 | 47 |
| 7 | 100 | 100 | 100 | 100 | 100 | 100 | 63 | 56 | 58 |
| 8 | 100 | 100 | 100 | 100 | 100 | 100 | 77 | 70 | 72 |

KF = potassium formate  EG = ethylene glycol

The results demonstrate that potassium formate solution is substantially equivalent to glycol in effectiveness.

The environmental acceptability of potassium formate, however, is superior to glycol.

Corrosion inhibitors commonly used with alkali metal or alkaline earth metal ice melters may be used with my potassium formate solutions; likewise, small amounts of water soluble polymers (an example is polyacrylamide) may be used in my invention together with the potassium formate to reduce loss through drainage. That is, the polymer will impart a viscosity to the solution sufficient to cause an increased portion of the solution to adhere to the particulates and remain on them to be effective in reducing the freezing point of any water that comes in contact with it.

Thus, my invention includes a method of inhibiting the solidification by freezing of a mass of solid particulates subject to precipitation comprising spraying onto said mass prior to said precipitation an aqueous solution comprising potassium formate. It will be understood that, either by accident of design, the solution may dry before the precipitation arrives, leaving a precipitate of potassium formate on the particulates, which will be dissolved by snow or freezing rain, thus reforming a potassium formate solution on the surfaces of the particulates.

My invention also includes a method of reducing the cohesiveness of a mass of particulates held together by frozen precipitation comprising spraying thereon an effective amount of a solution comprising potassium formate. The spraying may be done under high pressure.

In any case, whether the solution is applied before or after ice formation, it may include effective amounts of more or less conventional corrosion inhibitors such as triethanolamine, alkali metal and alkaline earth metal metaphosphates, pyrophosphates and orthophosphates, molybdates and borates, and organic amines known to inhibit corrosion in aqueous systems.

What is claimed is:

1. Method of inhibiting the solidification by freezing of a mass of solid particulates subject to precipitation comprising spraying onto said mass prior to said precipitation an aqueous solution comprising at least one percent by weight potassium formate.

2. Method of claim 1 wherein said solution comprises 1 to 76 weight percent potassium formate.

3. Method of claim 1 wherein said solution comprises 15 to 60% potassium formate by weight.

4. Method of claim 1 wherein said solution comprises 30 to 55% potassium formate by weight.

5. Method of claim 1 wherein said solid particulates are coal.

6. Method of claim 1 wherein said solution is sprayed after at least some ice formed on the surface of said solid particulates.

7. Method of claim 2 wherein said solution includes a corrosion inhibitor.

8. Method of claim 2 wherein said solution includes a viscosifier.

9. Method of claim 2 wherein said solution is permitted to dry prior to said precipitation.

10. Method of reducing the cohesiveness of a mass of particulates held together by frozen precipitation comprising spraying thereon a solution comprising potassium formate in an amount effective to reduce said cohesiveness.

11. Method of claim 10 wherein said solution comprises 1–76% potassium formate by weight.

12. Method of claim 10 wherein said solution comprises 15–60% potassium formate by weight.

13. Method of claim 10 wherein said solution comprises 30–55% potassium formate by weight.

14. Method of claim 11 wherein said spraying employs a high pressure spray.

15. Method of claim 11 wherein said solution includes a corrosion inhibitor.

16. Method of inhibiting the solidification by freezing of a mass of solid particulates subject to precipitation comprising sprinkling solid potassium formate onto said mass prior to said precipitation.

* * * * *